United States Patent
Zhou et al.

(10) Patent No.: US 11,717,752 B2
(45) Date of Patent: Aug. 8, 2023

(54) METHOD AND APPARATUS FOR CONTROLLING VIRTUAL CAMERA IN GAME

(71) Applicant: NETEASE (HANGZHOU) NETWORK CO.,LTD., Zhejiang (CN)

(72) Inventors: Wenchao Zhou, Zhejiang (CN); Kun Shao, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 67 days.

(21) Appl. No.: 17/043,739

(22) PCT Filed: Mar. 22, 2019

(86) PCT No.: PCT/CN2019/079280
§ 371 (c)(1),
(2) Date: Sep. 30, 2020

(87) PCT Pub. No.: WO2020/124839
PCT Pub. Date: Jun. 25, 2020

(65) Prior Publication Data
US 2021/0299562 A1    Sep. 30, 2021

(30) Foreign Application Priority Data
Dec. 19, 2018  (CN) ......................... 201811562465.0

(51) Int. Cl.
*A63F 13/5255* (2014.01)
*A63F 13/2145* (2014.01)
(Continued)

(52) U.S. Cl.
CPC ...... *A63F 13/5255* (2014.09); *A63F 13/2145* (2014.09); *A63F 13/42* (2014.09);
(Continued)

(58) Field of Classification Search
CPC ........................ A63F 13/5255; A63F 13/5258
See application file for complete search history.

(56) References Cited

U.S. PATENT DOCUMENTS

2013/0288790 A1\*  10/2013  Wang .................. A63F 13/2145
463/31
2014/0066195 A1    3/2014  Matsui et al.
(Continued)

FOREIGN PATENT DOCUMENTS

| CN | 104267904 A | 1/2015 |
|---|---|---|
| CN | 106919322 A | 7/2017 |

(Continued)

*Primary Examiner* — James S. McClellan
(74) *Attorney, Agent, or Firm* — Gang Yu

(57) ABSTRACT

A method and apparatus for controlling a virtual camera in a game are disclosed. In the embodiments of the present disclosure, a virtual camera is controlled to shift in response to a first touch operation for a visual field control area, the virtual camera is controlled, in response to the ending of the first touch operation, to return from a second position to a first position, a game operation instruction is received during the returning process, and a corresponding action is performed in response to the game operation instruction.

18 Claims, 8 Drawing Sheets

(51) Int. Cl.
*A63F 13/42* (2014.01)
*A63F 13/5258* (2014.01)
*A63F 13/56* (2014.01)
*G06F 3/0488* (2022.01)

(52) U.S. Cl.
CPC .......... *A63F 13/5258* (2014.09); *A63F 13/56* (2014.09); *G06F 3/0488* (2013.01); *A63F 2300/308* (2013.01); *A63F 2300/6676* (2013.01)

(56) References Cited

U.S. PATENT DOCUMENTS

| | | | | |
|---|---|---|---|---|
| 2015/0065243 | A1* | 3/2015 | Mizrahi | A63F 13/5258 |
| | | | | 463/31 |
| 2016/0306542 | A1* | 10/2016 | Melnik | G06F 3/04842 |
| 2018/0326302 | A1* | 11/2018 | Tsutsui | A63F 13/837 |
| 2019/0060745 | A1* | 2/2019 | He | A63F 13/847 |

FOREIGN PATENT DOCUMENTS

| | | | |
|---|---|---|---|
| CN | 106975219 | A | 7/2017 |
| CN | 107765986 | A | 3/2018 |
| CN | 107789830 | A | 3/2018 |
| CN | 107823882 | A | 3/2018 |
| CN | 107890664 | A | 4/2018 |
| CN | 107930114 | A | 4/2018 |
| CN | 108376424 | A | 8/2018 |
| CN | 108509139 | A | 9/2018 |
| JP | 2018-020150 | A | 2/2018 |
| WO | 2018177170 | A | 10/2018 |

* cited by examiner release upwards        release downwards

METHOD AND APPARATUS FOR CONTROLLING VIRTUAL CAMERA IN GAME

CROSS-REFERENCE TO RELATED APPLICATIONS

The present disclosure claims benefit of Chinese Patent Priority No, 201811562465.0, filed to the China Patent Office on Dec. 19, 2018, entitled "Method and Apparatus for Controlling Virtual Camera in Game", the contents of which are hereby incorporated by reference in its entirety.

TECHNICAL FIELD

The present disclosure relates to the technical field of games, and in particular, to a method and apparatus for controlling a virtual camera in a game.

BACKGROUND

In Multiplayer Online Battle Arena (MOBA) games, most of the MOBA games are to fix hero characters controlled thereby in the middle or nearby positions of a screen, while the role distance of some skills is very far, even exceeding the game screen. The player knows nothing about the role of the skill, and cannot effectively use the distance advantages of this skill.

SUMMARY

According to an embodiment of the present disclosure, a method for controlling a virtual camera in a game is provided. The method may be applied to a touch terminal rendered with a graphical user interface (GUI), content rendered on the GUI may comprising a game scene captured by a virtual camera, the game scene may at least include one virtual character, and the method include the following steps:

the position of the virtual camera is associated with the position of a game scene where the virtual character is located to control the movement of the virtual camera according to a change of the position of the virtual character;

a visual field control area is provided on the GUI, and in response to a first touch operation on the visual field control area, the virtual camera is controlled to shift from a first position to a second position according to the first touch operation;

in response to the ending of the first touch operation, the virtual camera is controlled to restore from the second position to the first position; and a game operation instruction is received during a process of restoring the virtual camera from the second position to the first position, and performing an action corresponding to game operation instruction.

According to another embodiment of the present disclosure also provide an apparatus for controlling a virtual camera in a game. The apparatus may be applied to a touch terminal rendered with a GUI. Contents rendered on the GUI may comprise a game scene captured by a virtual camera. The game scene may at least comprise a virtual character. The apparatus may include:

an association module, configured to associate the position of game scene where the virtual character is located to control the movement of the virtual camera according to a change of the position of the virtual character;

a shifting module, configured to provide a visual field control area on the GUI, in response to a first touch operation acting on the visual field control area, control the virtual camera to shift from a first position to a second position according to the first touch operation;

a restoration module, configured to control, in response to the ending of the first touch operation, the virtual camera to restore from the second position to the first position; and a response module, configured to receive a game operation instruction during a process of the virtual camera restoring the virtual camera from the second position to the first position, and performing an action corresponding to operation instruction.

According to another embodiment of the present disclosure also provides a storage medium, on which at least one computer program being executed by a processor to implement the following steps:

the position of the virtual camera is associated with the position of a game scene where the virtual character is located to control the movement of the virtual camera according to the position change of the virtual character;

a visual field control area is provided on the GUI, and in response to a first touch operation acting on the visual field control area, the virtual camera is controlled to shift from a first position to a second position according to the first touch operation;

in response to the ending of the first touch operation, the virtual camera is controlled to restore from the second position to the first position; and a game operation instruction is received during a process of restoring the virtual camera from the second position to the first position, and performing an action corresponding to game operation instruction.

According to another embodiment of the present disclosure also provides an electronic device. The device may include a memory and a processor. The memory is connected with the processor and configured to store at least one executable instruction of the processor, wherein the processor is arranged to execute the at least one executable instruction, and the at least one executable instruction comprises:

the position of the virtual camera is associated with the position of a game scene where the virtual character is located to control the movement of the virtual camera according to the position change of the virtual character;

a visual field control area is provided on the GUI, and in response to a first touch operation acting on the visual field control area, the virtual camera is controlled to shift from a first position to a second position according to the first touch operation;

in response to the ending of the first touch operation, the virtual camera is controlled to restore from the second position to the first position; and a game operation instruction is received during a process of restoring the virtual camera from the second position to the first position, and performing an action corresponding to game operation instruction.

BRIEF DESCRIPTION OF THE DRAWINGS

FIG. 3-1 illustrates a schematic diagram of an area desired to be observed by a user according to an embodiment of the present disclosure;

FIG. 3-2 illustrates a schematic diagram of an area captured by a camera after screen dragging according to an embodiment of the present disclosure;

FIG. 6-1 illustrates a schematic diagram of a process of camera returning after screen dragging according to an embodiment of the present disclosure;

FIG. 6-2 illustrates a schematic diagram of another process of camera returning after screen dragging according to an embodiment of the present disclosure;

DETAILED DESCRIPTION OF THE EMBODIMENTS

It is to be noted that in the case of no conflict, the features in the embodiments and the embodiments in the present application may be combined with each other. The embodiments of the present disclosure are described below with reference to the drawings and in conjunction with the embodiments in detail.

In order to make those skilled in the art better understand the solutions of the present application, the technical solutions in the embodiments of the present application will be clearly and completely described below with reference to the drawings in the embodiments of the present application.

Figure 1:
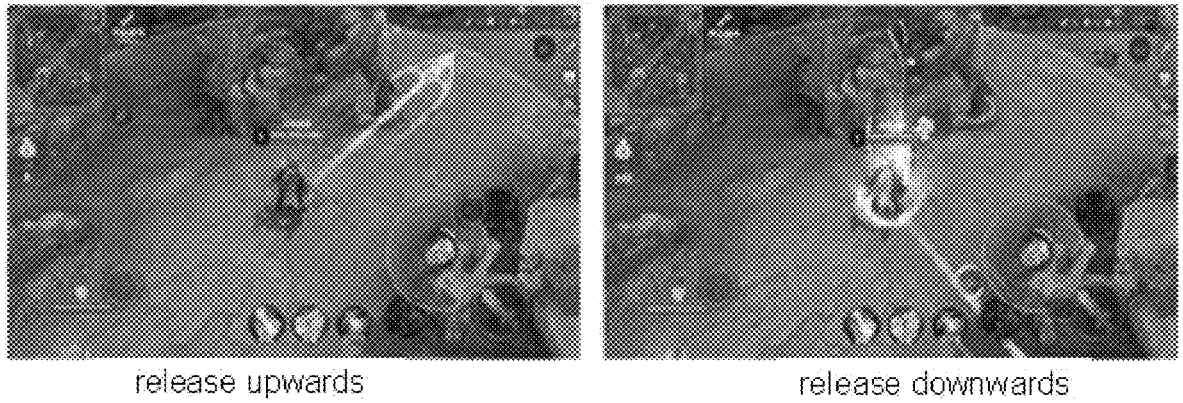
FIG. 1 illustrates a schematic diagram of releasing game skills from different perspectives in an existing game.

In addition, because some MOBA games use an angle of view that tilts part of the angle, this will cause that the full range can be seen if some skills are released upwards, but only part of the range or only half of the range can be seen if some skills are released downwards. As shown in FIG. 1, this will cause great disadvantages. Coupled with the limitation of a viewing angle output device (a mobile phone, a tablet, etc.), if a player needs to observe a game scene outside a screen where a character is located, the player needs to drag the screen.

A player continuously controls movement with the left hand and frequently switches an operation of releasing a skill or making an ordinary attack and an operation of dragging a screen with the right hand. Usually, the player first drags the screen with the right hand to observe a battlefield outside the screen. When the time is right, the player loosens a dragged screen area and presses a skill button to enter the battlefield with the right hand, drags the screen again to observe the battlefield after releasing the skill, and loosens again and releases the skill again. The operation is repeated for many times. This operation has high operation difficulty. Frequent switching with the right hand will increase the risk of misoperation. After screen dragging with the right hand is loosened, the camera flashes back to its hero screen, that is, a picture where the virtual character is located. If the screen is dragged once again, the camera is switched to the battlefield outside the screen. The operation is repeated. A game master will even switch back and forth at high speed. The rapid switching of the picture will cause extreme visual discomfort.

Figure 2:
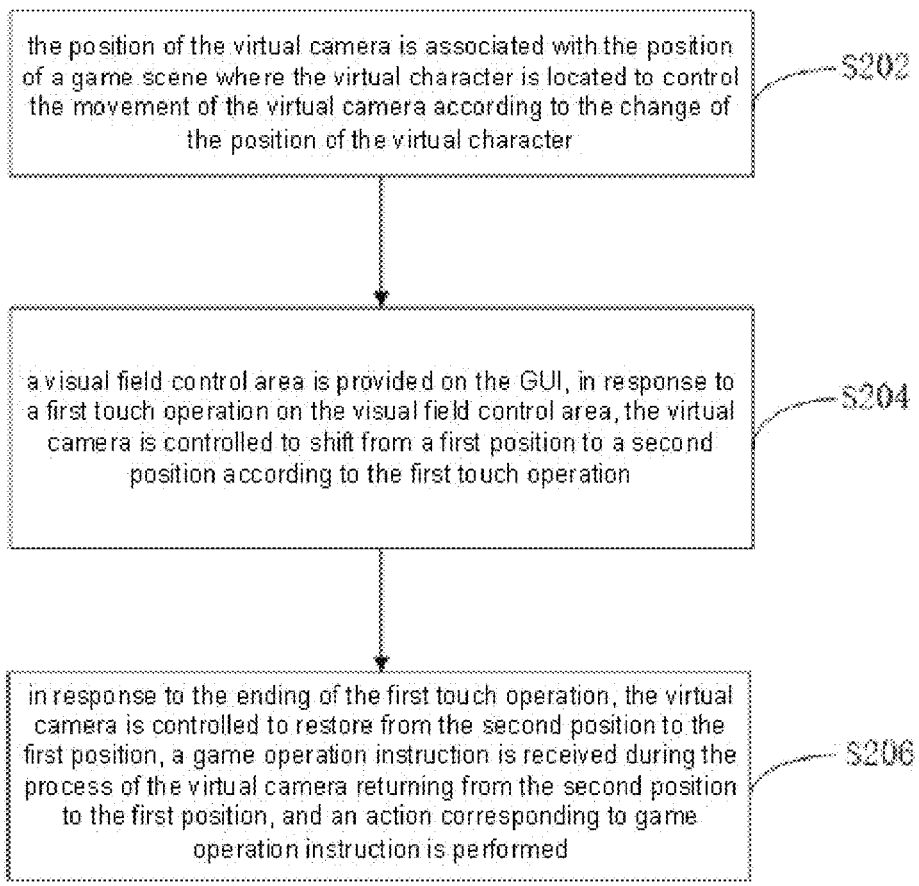
FIG. 2 illustrates a schematic flowchart of a method for controlling a virtual camera in a game according to an embodiment of the present disclosure.

As shown in FIG. 2, a method for controlling a virtual camera in a game provided by an embodiment of the present disclosure is applied to a touch terminal rendered with a GUI, contents rendered on the GUI comprising a game scene captured by a virtual camera, and the game scene at least includes a virtual character. The method specifically includes the following steps.

At step S202, the position of the virtual camera is associated with the position of a game scene where the virtual character is located to control the movement of the virtual camera according to the change of the position of the virtual character.

The GUI is an important part of a touch screen terminal. As an interface for interacting with a user, the user may operate on the GUI. In addition to displaying the game scene captured through the virtual camera, the GUI may also receive touch operations from the user through the touch screen, for example, control the game running in a touch terminal.

In this method, a virtual camera is associated with the position of a virtual character in a game scene, that is, an association relationship between the position of the virtual camera and the position of the virtual character in the game scene is established, for example, a mapping relationship for maintaining a fixed distance between the position of the virtual camera and the position of the virtual character in the game scene is established. The shooting angle of the virtual camera may be maintained at a default angle. Thus, when the position of the virtual character changes, the virtual camera also moves.

At step S204, a visual field control area is provided on the GUI, in response to a first touch operation on the visual field control area, the virtual camera is controlled to shift from a first position to a second position according to the first touch operation.

Figures 1, 3:
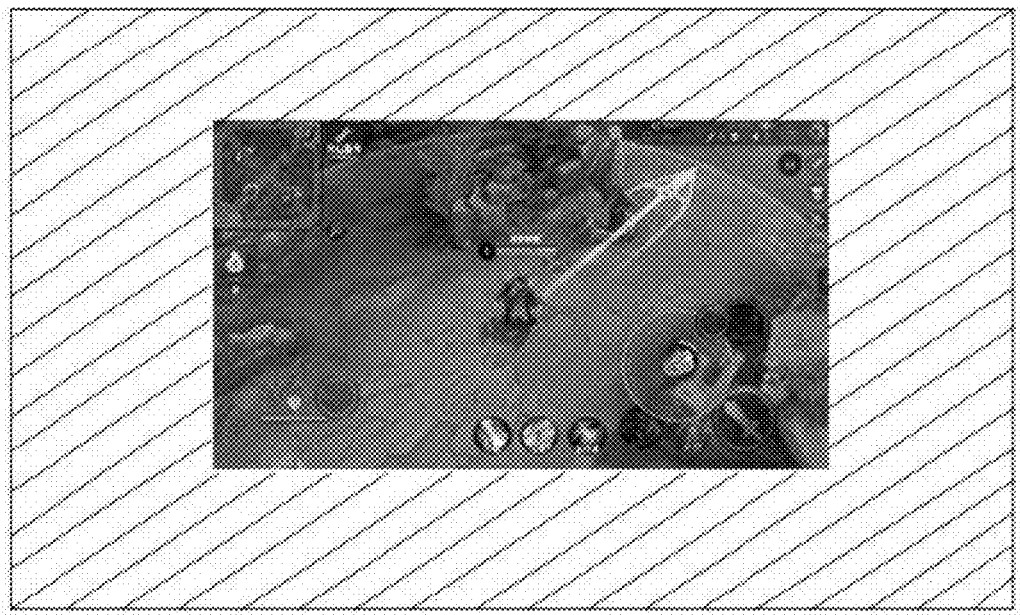
Figures 2, 3:

When the player/user wants to observe the dynamics outside the screen, as shown in FIG. 3-1, the slash area in FIG. 3-1 is outside the screen, but it is the range that the player wants to observe. Therefore, it is necessary to adjust the game scene displayed on the screen, and pull the image outside the screen into the current screen for display. Therefore, a visual field control area is provided on the GUI, the visual field control area being configured to adjust the screen display content according to an operation instruction. In the embodiments of the present disclosure, a user may perform a first touch operation in the visual field control area to achieve the purpose of adjusting the screen display content. The first touch operation herein may refer to a screen dragging operation, that is, the user presses the visual field control area and drags the screen.

Figure 4:
FIG. 4 illustrates a schematic diagram of another operation mode for controlling a virtual camera to in an existing game.

As an optional implementation manner, in the present embodiment, the interaction mode of camera adjustment is also improved, and the first touch operation may also be a swipe operation. That is, the embodiment of the present disclosure uses a "swipe" gesture operation to complete the screen dragging effect. The swipe operation refers to that the user gently slides on the visual field control area with a finger, and the game scene does not slide with the finger. The swipe direction of a finger is detected to shift the virtual camera to a position in this direction. Referring to FIG. 4, the directions of swiping to various regions are shown by arrows in FIG. 4. The screen may be shifted to a position in a direction after swiping to a certain arrow direction instead of holding the screen and dragging it to a position in the direction. The screen dragging operation mode is simple and easy to introduce.

When a terminal detects the first touch operation, in response to the first touch operation, a virtual camera is controlled to shift according to the first touch operation. For example, the shifting direction of the virtual camera may be determined according to an acting direction of the first touch operation on the screen. Optionally, the shifting direction of the virtual camera is consistent with the movement direction of a touch point generated by the first touch operation on the touch screen. When the virtual camera shifts, the game scene captured by the virtual camera also changes accordingly. Therefore, the game scene captured after the virtual camera shifts is displayed on the GUI. When the user performs the first touch operation, it indicates that the user wants to observe the game scene in the direction of the first touch operation. Therefore, the embodiments of the present disclosure determine the direction as the shifting direction of the virtual camera, which is compliance with user expectations.

It is to be noted that the first position mentioned here refers to the position of the virtual camera when the first touch operation is detected, that is, before shifting, and the second position here refers to a position reached after the virtual camera shifts.

Further, the shifting distance of the rotating virtual camera may also be determined according to the distance or/and speed of the touch point generated by the first touch operation on the touch screen. The second position may be obtained according to the first position and the shifting distance.

At step S206, in response to the ending of the first touch operation, the virtual camera is controlled to restore from the second position to the first position, a game operation instruction is received during the process of the virtual camera returning from the second position to the first position, and an action corresponding to game operation instruction is performed.

In the embodiments of the present disclosure, in order to achieve the purpose that a user can perform certain game operations while browsing images outside a screen display area, the embodiments of the present disclosure adopt a manner that when the ending of the first touch operation is detected, for example, when the first touch operation leaves the visual field control area or the first touch operation leaves the screen, the virtual camera is controlled to slowly return to the normal position, that is, slowly return from a position after shifting (the second position) to a position before shifting (the first position). In the process of returning the virtual camera, the user can perform game operations and generate game operation instructions, so that the game system can perform corresponding actions according to the game operation instructions. Since the embodiments of the present disclosure change the traditional mode that the camera is flashed after the finger dragging the screen is released, the virtual camera is slowly returned to the position before shifting. There is a transitory stage, which gives a player a buffer time to move into the battlefield. The line of sight of the player can still remain in the battlefield area, and meanwhile, the player may consider own movement without frequently switching between the hero and the scene. The battlefield here refers to a scene area where the two parties in the game play a game battle or a scene area where the enemy unit is located in the game. The judgment of the battlefield can be determined by the game system according to preset logics.

In the embodiments of the present disclosure, the speed at which the virtual camera moves from the second position to the first position is configurable, that is, the return speed of the virtual camera is configurable. For example, it can be set by the user in the setting options, the user can select an appropriate return speed according to actual demands, the game system can also dynamically configure the return speed according to the user level, the current game difficulty level and other factors, so as to obtain a more appropriate return speed, which is convenient for the user operations.

Referring to FIG. 3-2, the shaded area in FIG. 3-2 is a newly obtained observation area after dragging the screen. When the finger of the user performing the screen dragging operation leaves the screen, in the embodiments of the present disclosure, there will be a transitory stage for the return of the virtual camera, that is, the virtual camera is slowly returning to the correction position. Therefore, although the game character/virtual character is not in the middle of the screen at this time, it can still have a very good visual field, and the player can observe the controlled game characters and new observation areas, which may provide a reference for the next game strategy.

Further, in the process of controlling the virtual camera to restore from the second position to the first position, when the received game operation instruction is an operation instruction for controlling the movement of the virtual character, an action that corresponding to operation instruction is performed includes the following step: the movement of the virtual camera is controlled according to the position change of the virtual character. It can be seen that when the virtual camera returns to normal, if the user controls the movement of the game character/virtual character at this time, due to the association relationship between the position of the virtual character in the game scene and the virtual camera, when the position of the virtual character changes, the virtual camera will also change, so if the virtual character has moved before the virtual character has reached the second position, the virtual camera will move to the corresponding position at this time. Therefore, the virtual character does not need to return to the position before shifting and then move with the virtual character, thereby meeting the needs of users in a more direct and fast way.

As can be seen from the above, in the embodiments of the present disclosure, a virtual camera is controlled to shift from a first position to a second position in response to a first touch operation for a visual field control area, the virtual camera is controlled, in response to the ending of the first touch operation, to return from a second position to a first position, a game operation instruction is received during the returning process, and a corresponding action is performed in response to the game operation instruction. Therefore, after dragging the screen, the user has enough time to perform game operations during the returning of the virtual camera. The user only needs a simple operation to have a very good visual field. When it is more convenient to observe an image scene presented by screen dragging, certain game operations may also be performed, so that the problems of frequent screen dragging and easy misoperation are avoided, thereby focusing on the truly fun operation experience.

Figure 5:
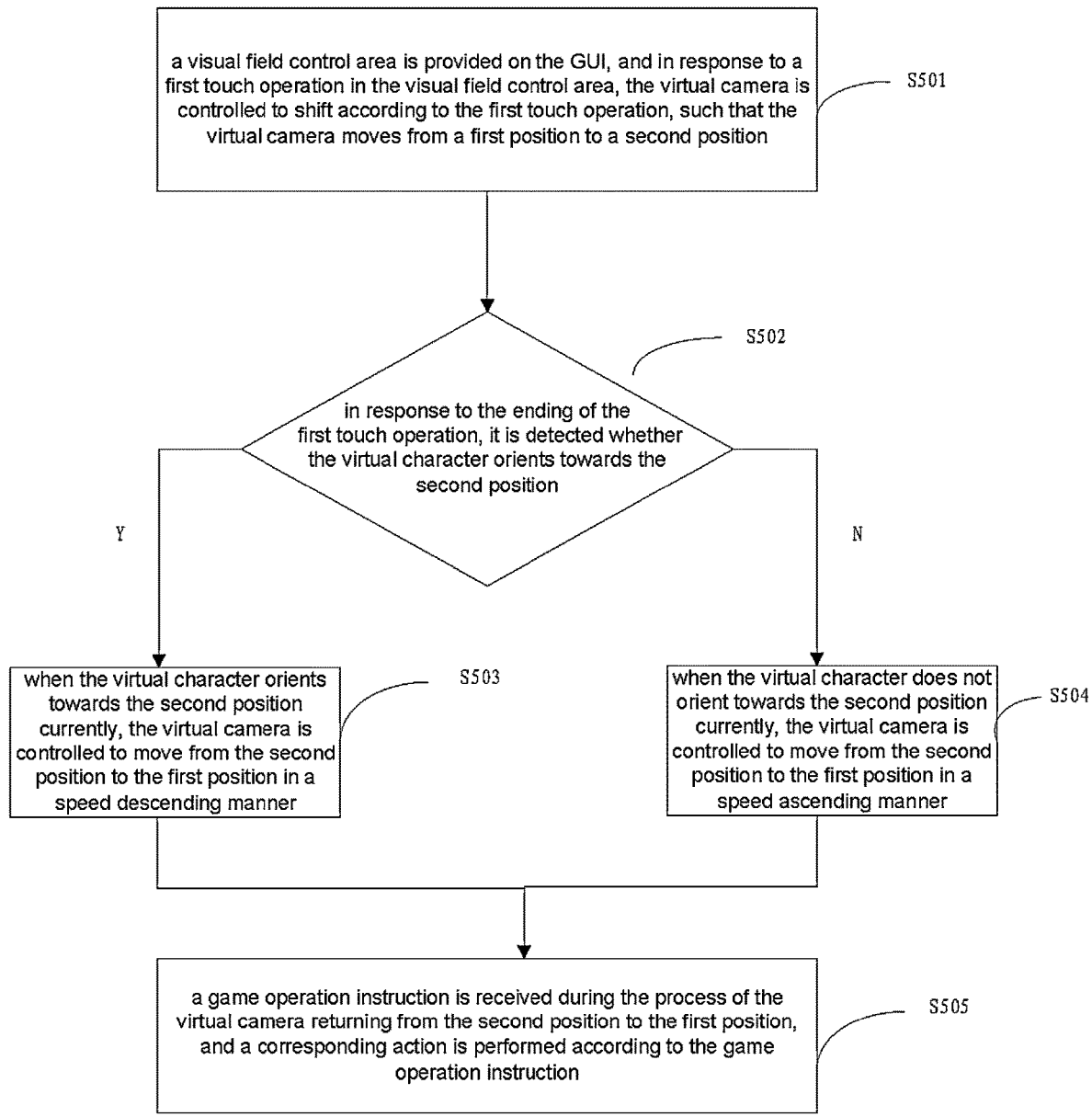
FIG. 5 illustrates a schematic flowchart of another method for controlling a virtual camera in a game according to an embodiment of the present disclosure.

As shown in FIG. 5, an embodiment of the present disclosure also provides a method for controlling a virtual camera in a game, which may also be applied to a touch terminal rendered with a GUI, contents rendered on the GUI includes a game scene captured by a virtual camera, and the game scene at least includes a virtual character. The method specifically includes the following steps.

At step S501, a visual field control area is provided on the GUI, and in response to a first touch operation in the visual field control area, the virtual camera is controlled to shift according to the first touch operation, such that the virtual camera moves from a first position to a second position.

At step S502, in response to the ending of the first touch operation, it is detected whether the virtual character orients towards the second position.

In the embodiments of the present disclosure, when the ending of the first touch operation is detected, the virtual camera needs to return from the current second position to the first position before shifting. In order to achieve a reasonably configuring the return speed of the virtual camera, the return speed may be configured according to the current orientation of the virtual character. Therefore, the embodiments of the present disclosure preferably detect whether the virtual character is currently facing the second position, that is, whether it is facing the observation area, which is generally a battlefield area.

At step S503, when the virtual character orients towards the second position currently, the virtual camera is controlled to move from the second position to the first position in a speed descending manner.

That is, when the game character/virtual character is facing the battlefield (second position), such as advancing toward the second position, the battlefield information is more important at this time. Therefore, the virtual camera may be returned in a decelerated manner, so that the user has more time to observe the battlefield information.

At step S504, when the virtual character does not orient towards the second position currently, the virtual camera is controlled to move from the second position to the first position in a speed ascending manner.

That is, when the game character/virtual character is not orient towards the battlefield (second position), such as moving away from the second position, the user wants to leave the battlefield at this time, so the battlefield information is lower than the demand level for leaving, then it is convenient for users to observe the exit path and leave faster, which can speed up the return of the virtual camera. It is to be noted that not facing the virtual camera here includes facing away from the current position of the virtual camera, and also includes facing away from the current position of the virtual camera diagonally.

At step S505, a game operation instruction is received during the process of the virtual camera returning from the second position to the first position, and a corresponding action is performed according to the game operation instruction.

It is to be noted that the steps shown in the flowchart of FIG. 5 may be executed in a computer system including, for example, a set of computer-executable instructions. Moreover, although a logic sequence is shown in the flowchart, the shown or described steps may be executed in a sequence different from the sequence here under certain conditions.

As can be seen from the above, in the embodiments of the present disclosure, before returning the virtual camera, that is, before moving from the position after shifting to the position before shifting, it is first detected whether the virtual character in the current game scene is facing the location of the virtual camera. If the virtual character is facing the current location of the virtual camera, the virtual camera slowly returns to the position before shifting, during the slow return process, the speed gradually decreases. If the virtual character does not face the current location of the virtual camera, the virtual camera slowly returns to the position before shifting, during the slow return process, the speed gradually increases. The acceleration in the gradual increase or decrease in speed may be constant or variable, which is not limited in the present disclosure.

Specifically, in the traditional mode of dragging a screen, dragging the screen and releasing the finger may be flashback. During the actual game, the player needs to constantly switch between the hero and the scene. The implementation manner of the present disclosure implements that the restoration of the virtual camera is slow, there is a transition phase, and the speed of restoration is configurable. And the embodiments of the present disclosure can intelligently adjust the returning process. As the camera slowly returns, it will judge the orientation of the player.

Figures 1, 6:
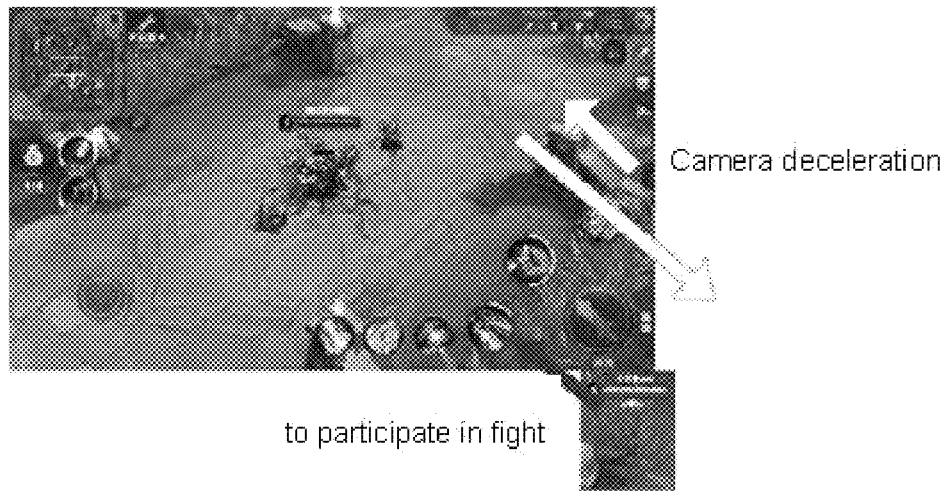
Figures 2, 6:
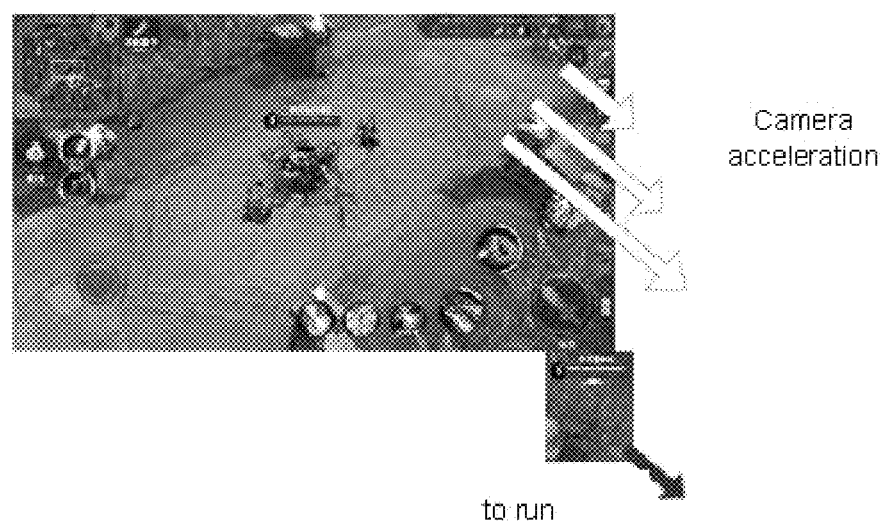

As shown in FIG. 6-1, FIG. 6-1 shows the game scene captured by the camera after dragging the screen, which contains the battle scene. If the player is advancing toward the battlefield (that is, the position of the camera after dragging the screen), it means that the player wants to enter the battlefield. The player is about to enter the battlefield. The information on this battlefield is very important. Then the speed of the camera return to normal gradually decreases. This will give the player a buffer time when moving into the battlefield. The line of sight of the player can still remain in the battlefield area, and at the same time can also consider own movement.

As shown in FIG. 6-2, FIG. 6-2 shows the game scene captured by the camera after dragging the screen, which contains the battle scene. If the player is advancing away from the battlefield (that is, the position of the camera after dragging the screen), it means that the player wants to leave the battlefield. The urgency of the player leaving is higher than the knowledge of the current battlefield information. Then, the returning speed of the camera is increased.

Meanwhile, in order to prevent the speed of the camera caused by in-situ circling of the player, the movement speed of the camera will only be adjusted after the player has held the direction for a certain amount of time. The method for controlling a virtual camera in a game provided by the embodiment of the present disclosure further includes that: before controlling the movement speed of the virtual camera to decrease or increase, it is determined that a duration of keeping the virtual character in the current orientation reaches a first preset duration. That is, the movement speed of the camera will only be adjusted after the player has held the direction for a certain amount of time.

Further, in order to facilitate a user to observe a game scene after screen dragging, before controlling the virtual camera to move from the second position to the first position, the method further includes that: it is determined that a duration of the virtual camera at the second position reaches a second preset duration. That is, after the user drags the screen and releases the finger, the GUI keeps the game scene displayed after dragging the screen for a certain period of time, and then automatically returns to the correct position, thereby ensuring the browsing needs of the user and requiring no additional actions, which is very convenient.

As an optional implementation manner, in the embodiments of the present disclosure, the operation that the virtual camera is controlled to return from the second position to the first position specifically includes the following steps:

it is determined whether a game scene currently displayed on the GUI contains the virtual character;

when the game scene currently displayed on the GUI does not contain the virtual character, that is, if the game scene currently displayed on the GUI does not contain a virtual character, the virtual camera is controlled to move from the second position to the first position at a first preset speed; and when the game scene currently displayed on the GUI contains the virtual character, that is, if the game scene currently displayed on the GUI contains a virtual character, the virtual camera is controlled to move from the second position to the first position at a second preset speed, the second preset speed is less than the first preset speed.

The embodiments of the present disclosure mainly consider that when a game scene currently displayed on the GUI does not contain a virtual character, it indicates that the current location of the virtual camera is far from the position of the virtual character. At this time, the movement speed of the virtual camera may be slightly higher, and when the game scene currently displayed on the GUI contains a virtual character, it indicates that the current location of the virtual camera is relatively close to the position of the virtual character. At this time, the movement speed of the virtual camera may be slightly lower, which is more in line with observation and operation requirements of the users.

As an optional implementation manner, in the embodiments of the present disclosure, the operation that the virtual camera is controlled to return from the second position to the first position further includes that:

It is detected whether the virtual character is in a moving state;

when the virtual character is in the moving state, that is, if it is detected that the virtual character is in a moving state currently, the virtual camera is moved from the second position to the first position at a third preset speed; and when the virtual character is not in the moving state, that is, if it is detected that the virtual character is not in a moving state currently, the virtual camera is moved from the second position to the first position at a fourth preset speed, the third preset speed is greater than the fourth preset speed.

The embodiments of the present disclosure mainly consider that when a virtual character moves, it indicates that a player may want to enter an area for the next action, so a virtual camera may move at a slightly higher speed at this time; when the virtual character is not currently in a moving state, it indicates that the player may be thinking or observing, the virtual camera may move at a slightly lower speed at this time to provide users with more observation or thinking time. Therefore, in the embodiments of the present disclosure, a third preset speed is greater than a fourth speed, which is more in line with game requirements of the users.

Figure 7:
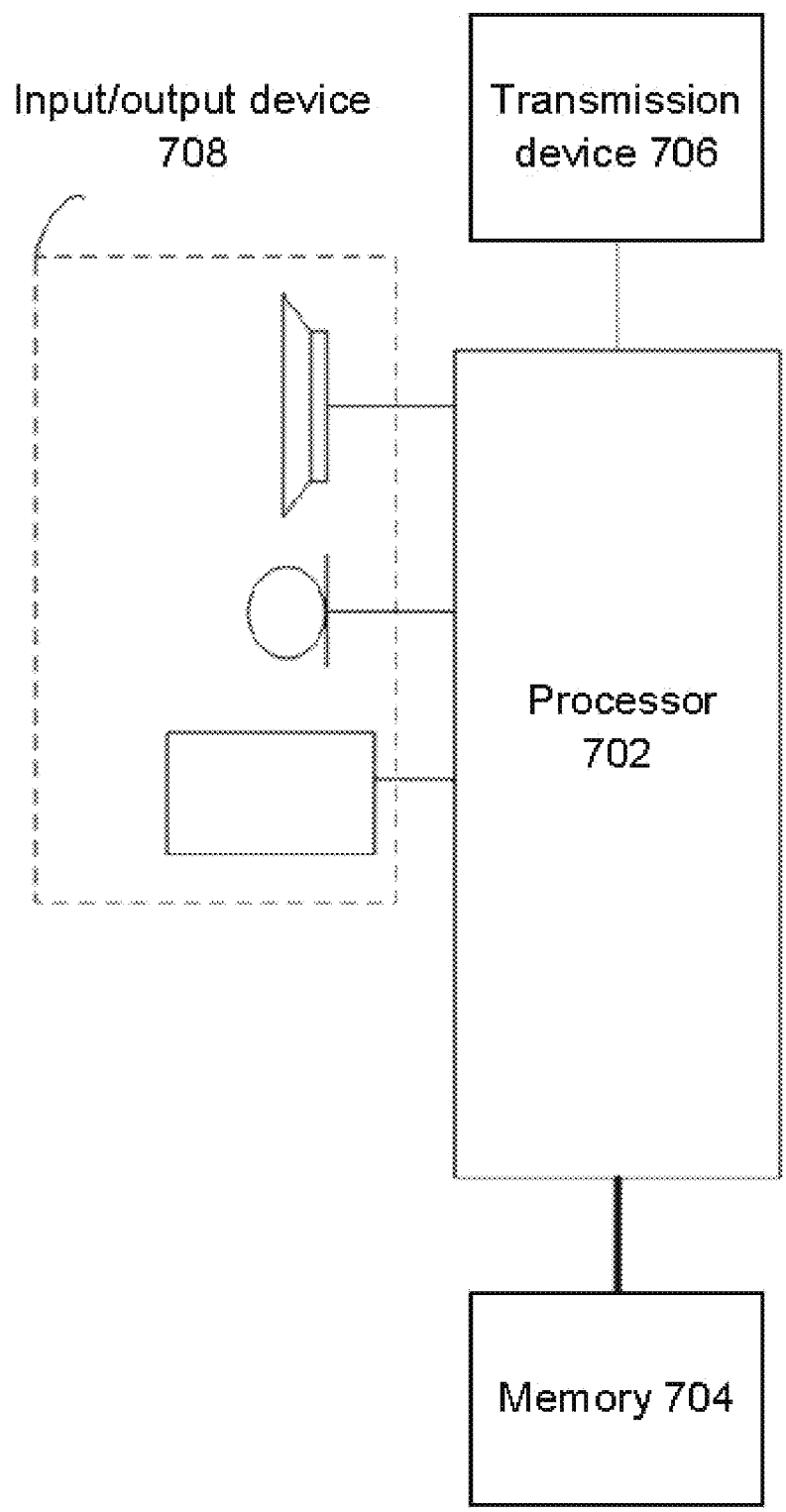
FIG. 7 illustrates a block diagram of a hardware structure of a mobile terminal running a method for controlling a virtual camera in a game according to an embodiment of the present disclosure.

The method embodiment provided by the embodiments of the present application may be executed in a mobile phone, a tablet, or a similar touch screen control device. Running on a mobile terminal is taken as an example. FIG. 7 is a block diagram of a hardware structure of a mobile terminal for a method for controlling a virtual camera in a game according to an embodiment of the present disclosure. As shown in FIG. 7, the mobile terminal may include one or more (only one is shown in FIG. 1) processors 702 (the processor 702 may include but is not limited to a processing apparatus such as a Micro Controller Unit (MCU) or a Field Programmable Gate Array (FPGA)) and a memory 704 for storing data. Optionally, the above mobile terminal may further include a transmission device 706 and an input/output device 708 for communication functions. Those skilled in the art can understand that the structure shown in FIG. 7 is merely illustrative, and does not limit the structure of the above mobile terminal. For example, the mobile terminal may also include more or fewer components than shown in FIG. 7, or has a different configuration from that shown in FIG. 7.

The memory 704 may be configured to store a computer program, for example, a software program and module of application software, such as a computer program corresponding to the method for controlling a virtual camera in a game in the embodiment of the present disclosure, and the processor 702 executes various functional applications and data processing by running the computer program stored in the memory 704, that is, implements the above method. The memory 704 may include a high speed random access memory and may also include a non-volatile memory such as one or more magnetic storage devices, a flash memory, or other non-volatile solid state memories. In some examples, the memory 704 may further include memories remotely located relative to the processor 702, which may be connected to the mobile terminal over a network. The examples of such networks include, but are not limited to, the Internet, the Intranet, local area networks, mobile communication networks, and combinations thereof.

The transmission device 706 is configured to receive or send data via a network. The above specific network example may include a wireless network provided by a communication provider of the mobile terminal. In one example, the transmission device 706 includes a Network Interface Controller (NIC) that may be connected to other network devices through a base station to communicate with the Internet. In one example, the transmission device 706 may be a Radio Frequency (RF) module for communicating with the Internet wirelessly.

An embodiment of the present disclosure also provides an apparatus for controlling a virtual camera in a game. It is to be noted that the apparatus for controlling a virtual camera in a game in this embodiment may be configured to perform the method for controlling a virtual camera in a game in the embodiment of the present disclosure.

Figure 8:
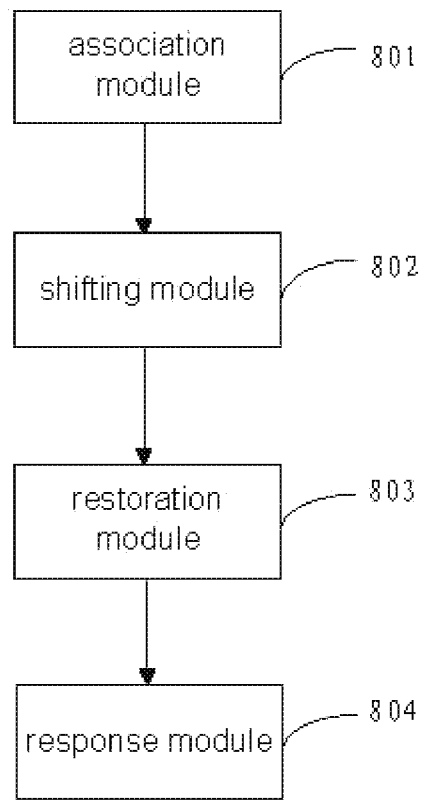
FIG. 8 illustrates a schematic structural diagram of an apparatus for controlling a virtual camera in a game according to an embodiment of the present disclosure.

FIG. 8 is a schematic structural diagram of an apparatus for controlling a virtual camera in a game according to an embodiment of the present disclosure. The apparatus should be configured as a touch terminal rendered with a GUI, contents rendered on the GUI comprising a game scene captured by a virtual camera, and the game scene at least includes a virtual character. As shown in FIG. 8, the apparatus includes: an association module 801, a shifting module 802, a restoration module 803, and a response module 804.

The association module 801 is configured to associate the virtual camera with a position of a game scene where the virtual character is located to control the movement of the virtual camera according to the position change of the virtual character.

The shifting module 802 is configured to provide a visual field control area on the GUI, in response to a first touch operation acting on the visual field control area, control the virtual camera to shift from a first position to a second position according to the first touch operation.

The restoration module 803 is configured to control, in response to the ending of the first touch operation, the virtual camera to restore from the second position to the first position.

The response module 804 is configured to receive a game operation instruction during a process of the virtual camera restoring the virtual camera from the second position to the first position, and performing an action corresponding to operation instruction.

Further, the restoration module 803 is configured to: detect whether the virtual character orients towards the second position; when the virtual character orients towards the second position, control the virtual camera to move from the second position to the first position in a speed descending manner; and when the virtual character does not orient towards the second position, control the virtual camera to move from the second position to the first position in a speed ascending manner.

In this embodiment, the shifting module 802 controls a virtual camera to shift from a first position to a second position in response to a first touch operation for a visual field control area, the restoration module 803 controls the virtual camera to restore from the second position to the first position in response to the ending of the first touch operation, and during the restoration process, a game operation instruction of a user may be received, thereby performing a corresponding action according to the game operation instruction. The user has enough time to perform game operations during the drag screening returning process. The user only needs a simple operation to have a very good visual field. When it is more convenient to observe an image scene presented by screen dragging, certain game operations may also be performed, so that the problems of frequent screen dragging and easy misoperation are avoided, thereby focusing on the truly fun operation experience.

An embodiment of the present disclosure also provides a storage medium. The storage medium stores a computer program, the computer program is configured to perform the steps in any one of the above method embodiments during running.

Figure 9:
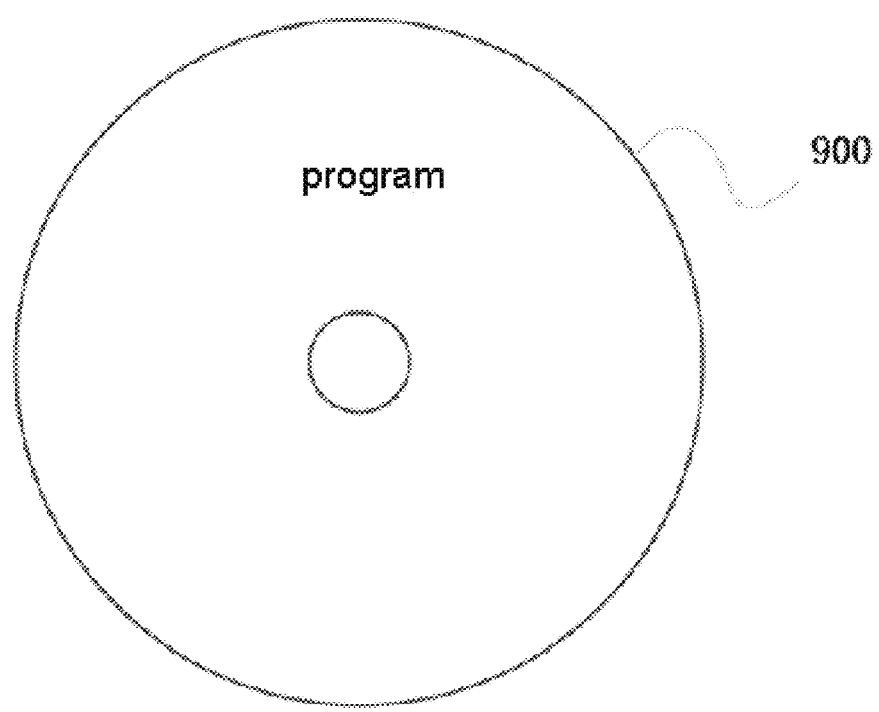
FIG. 9 illustrates a structure schematic diagram of a storage medium according to one embodiment of the present disclosure.

FIG. 9 is a structure schematic diagram of a storage medium according to one embodiment of the present disclosure. As shown in FIG. 9, a program product 900 according to an implementation manner of the present disclosure is described. A computer program is stored thereon. When being executed by a processor, the computer program has a program code implementing the following steps:

the position of the virtual camera is associated with the position of a game scene where the virtual character is located to control the movement of the virtual camera according to the position change of the virtual character;

a visual field control area is provided on the GUI, in response to a first touch operation acting on the visual field control area, the virtual camera is controlled to shift from a first position to a second position according to the first touch operation;

in response to the ending of the first touch operation, the virtual camera is controlled to restore from the second position to the first position; and a game operation instruction is received during the process of the virtual camera returning from the second position to the first position, and an action corresponding to game operation instruction is performed.

Optionally, the computer program is executed by the processor to implement a program code for the following steps:

when the game operation instruction is an operation instruction for controlling the movement of the virtual character, the movement of the virtual camera is controlled according to the position change of the virtual character.

Optionally, the computer program is executed by the processor to implement a program code for the following steps:

it is detected whether the virtual character orients towards the second position;

when the virtual character orients towards the second position, the virtual camera is controlled to move from the second position to the first position in a speed descending manner; and when the virtual character does not orients towards the second position, the virtual camera is controlled to move from the second position to the first position in a speed ascending manner.

Optionally, the computer program is executed by the processor to implement a program code for the following steps:

before controlling the movement speed of the virtual camera to decrease or increase, it is determined that a duration of keeping the virtual character in the current orientation reaches a first preset duration.

Optionally, the computer program is executed by the processor to implement a program code for the following steps:

in a fourth possible implementation manner of the first aspect, before controlling the virtual camera to move from the second position to the first position, it is determined that a duration of the virtual camera at the second position reaches a second preset duration.

Optionally, the computer program is executed by the processor to implement a program code for the following steps:

it is detected whether a game scene currently displayed on the GUI contains the virtual character;

when the game scene currently displayed on the GUI does not contain the virtual character, the virtual camera is controlled to move from the second position to the first position at a first preset speed; and when the game scene currently displayed on the GUI contains the virtual character, the virtual camera is controlled to move from the second position to the first position at a second preset speed, the second preset speed is less than the first preset speed.

Optionally, the computer program is executed by the processor to implement a program code for the following steps:

it is detected whether the virtual character is in a moving state;

when the virtual character is in the moving state, the virtual camera is moved from the second position to the first position at a third preset speed; and when the virtual character is not in the moving state, the virtual camera is moved from the second position to the first position at a fourth preset speed, the third preset speed is greater than the fourth preset speed.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

An embodiment of the present disclosure also provides an electronic device, which includes a memory and a processor. The memory stores a computer program. The processor is configured to run the computer program to perform the steps in any one of the above method embodiments.

Optionally, the electronic device may further include a transmission device and an input/output device, the transmission device is connected to the processor, and the input/output device is connected to the processor.

In order to achieve the above objective, according to another aspect of the present disclosure, the embodiment of the present disclosure also provides a processor.

Figure 10:
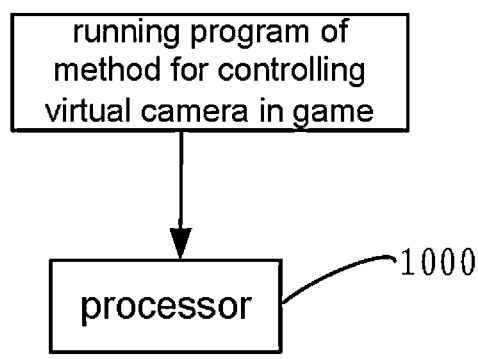
FIG. 10 illustrates a structural schematic diagram of a processor according to an embodiment of the present disclosure.

FIG. 10 is a structure schematic diagram of a processor according to one embodiment of the present disclosure. As shown in FIG. 10, the processor 1000 is configured to run a program. The program is run to perform the above code hot-update method.

In the embodiments of the present disclosure, the processor may execute a running program of the method for controlling a virtual camera in a game.

The processor may be configured to perform the following steps:

the position of the virtual camera is associated with the position of a game scene where the virtual character is located to control the movement of the virtual camera according to the position change of the virtual character;

a visual field control area is provided on the GUI, in response to a first touch operation acting on the visual field control area, the virtual camera is controlled to shift from a first position to a second position according to the first touch operation;

in response to the ending of the first touch operation, the virtual camera is controlled to restore from the second position to the first position; and a game operation instruction is received during the process of the virtual camera returning from the second position to the first position, and an action corresponding to game operation instruction is performed.

Optionally, the processor may also be configured to perform the following steps:

when the game operation instruction is an operation instruction for controlling the movement of the virtual character, the movement of the virtual camera is controlled according to the position change of the virtual character.

Optionally, the processor may also be configured to perform the following steps:

it is detected whether the virtual character orients towards the second position;

when the virtual character orients towards the second position, the virtual camera is controlled to move from the second position to the first position in a speed descending manner; and when the virtual character does not orients towards the second position, the virtual camera is controlled to move from the second position to the first position in a speed ascending manner.

Optionally, the processor may also be configured to perform the following steps:

before controlling the movement speed of the virtual camera to decrease or increase, it is determined that a duration of keeping the virtual character in the current orientation reaches a first preset duration.

Optionally, the processor may also be configured to perform the following steps:

in a fourth possible implementation manner of the first aspect, before controlling the virtual camera to move from the second position to the first position, it is determined that a duration of the virtual camera at the second position reaches a second preset duration.

Optionally, the processor may also be configured to perform the following steps:

it is determined whether the game scene currently displayed on the GUI contains the virtual character;

when the game scene currently displayed on the GUI does not contain the virtual character, the virtual camera is controlled to move from the second position to the first position at a first preset speed; and when the game scene currently displayed on the GUI contains the virtual character, the virtual camera is controlled to move from the second position to the first position at a second preset speed, the second preset speed is less than the first preset speed.

Optionally, the processor may also be configured to perform the following steps:

it is detected whether the virtual character is in a moving state;

when the virtual character is in the moving state, the virtual camera is moved from the second position to the first position at a third preset speed; and when the virtual character is not in the moving state, the virtual camera is moved from the second position to the first position at a fourth preset speed, the third preset speed is greater than the fourth preset speed.

It is apparent that those skilled in the art should understand that the above-mentioned modules or steps of the present disclosure may be implemented by a general-purpose computing device, and they may be centralized on a single computing device or distributed on a network composed of multiple computing devices. Optionally, they may be implemented with program codes executable by a computing device, so that they may be stored in a storage device and executed by the computing device, and in some cases, the steps shown or described may be performed in a different order than here, or they are separately made into individual integrated circuit modules, or multiple modules or steps therein are made into a single integrated circuit module for implementation. As such, the present disclosure is not limited to any particular combination of hardware and software.

The above is only the preferred embodiments of the present disclosure, not intended to limit the present disclosure. As will occur to those skilled in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

The solution provided in the embodiments of the present application may be used to facilitate a user to manipulate a terminal to observe an image presented on a screen. In the technical solutions provided by the embodiments of the present application, it may be applied to a device such as a mobile terminal. A virtual camera is controlled to shift from a first position to a second position in response to a first touch operation for a visual field control area, the virtual camera is controlled, in response to the ending of the first touch operation, to return from a second position to a first position, a game operation instruction is received during the returning process, and a corresponding action is performed according to the game operation instruction. Therefore, after dragging the screen, the user has enough time to perform game operations during the returning of the virtual camera. The user only needs a simple operation to have a very good visual field. When it is more convenient to observe an image scene presented by screen dragging, certain game operations may also be performed, so that the problems of frequent screen dragging and easy misoperation are avoided, thereby focusing on the truly fun operation experience.

What is claimed is:

1. A method for controlling a virtual camera in a game, applied to a touch terminal rendered with a graphical user interface (GUI), contents rendered on the GUI comprising a game scene captured by the virtual camera, the game scene at least comprising a virtual character, the method comprising:

associating the virtual camera with a position of a game scene where the virtual character is located to control a movement of the virtual camera according to a change of the position of the virtual character;

providing a visual field control area on the GUI, in response to a first touch operation on the visual field control area, controlling the virtual camera to shift from a first position to a second position according to the first touch operation and in response to the ending of the first touch operation, controlling the virtual camera to restore from the second position to the first position, receiving a game operation instruction during a process of restoring the virtual camera from the second position to the first position, and performing an action corresponding to the game operation instruction;

wherein the process of restoring the virtual camera from the second position to the first position comprises: detecting whether the virtual character orients towards the second position; when the virtual character orients towards the second position, controlling the virtual camera to move from the second position to the first position in a speed descending manner; and when the virtual character does not orient towards the second position, controlling the virtual camera to move from the second position to the first position in a speed ascending manner.

2. The method as claimed in claim 1, wherein when the game operation instruction is an operation instruction for controlling the movement of the virtual character, performing an action corresponding to the game operation instruction comprises:

controlling the movement of the virtual camera according to the change of the position of the virtual character.

3. The method as claimed in claim 1, further comprising: before controlling the movement speed of the virtual camera to decrease or increase, determining that the virtual character maintains a current orientation for a first preset duration.

4. The method as claimed in claim 1, wherein before controlling the virtual camera to restore from the second position to the first position, the method further comprises: determining that a duration of the virtual camera at the second position reaches a second preset duration.

5. The method as claimed in claim 1, wherein controlling the virtual camera to restore from the second position to the first position comprises:

determining whether the game scene currently displayed on the GUI contains the virtual character;

when the game scene currently displayed on the GUI does not contain the virtual character, controlling the virtual camera to move from the second position to the first position at a first preset speed; and when the game scene image currently displayed on the GUI contains the virtual character, controlling the virtual camera to move from the second position to the first position at a second preset speed, wherein the second preset speed is less than the first preset speed.

6. The method as claimed in claim 1, wherein controlling the virtual camera to restore from the second position to the first position comprises:

detecting whether the virtual character is in a moving state;

when the virtual character is in the moving state, controlling the virtual camera to restore from the second position to the first position at a third preset speed; and when the virtual character is not in the moving state, controlling the virtual camera to restore from the second position to the first position at a fourth preset speed, wherein the third preset speed is greater than the fourth preset speed.

7. The method as claimed in claim 1, wherein the first touch operation refers to a screen dragging operation.

8. The method as claimed in claim 1, wherein associating the virtual camera with a position of the virtual character in a game scene, comprises: establishing a mapping relationship for maintaining a fixed distance between the position of the virtual camera and the position of the virtual character in the game scene.

9. The method as claimed in claim 1, wherein the visual field control area is configured to adjust the screen display content according to an operation instruction.

10. The method as claimed in claim 1, wherein the first touch operation is configured to be a swipe operation.

11. The method as claimed in claim 1, wherein the first position refers to a position of the virtual camera when the first touch operation is detected, and the second position refers to a position reached by the shifted the virtual camera.

12. The method as claimed in claim 1, wherein a shifting distance of the rotating virtual camera is determined according to the distance or/and speed of the touch point generated by the first touch operation on the touch screen, the second position is obtained according to the first position and the shifting distance.

13. The method as claimed in claim 1, wherein the speed of which the virtual camera moves from the second position to the first position is configurable.

14. A non-transitory storage medium, in which a program is stored, wherein the program is run to control a device where the non-transitory storage medium is located to perform the following method:

associating the virtual camera with a position of a game scene where the virtual character is located to control a movement of the virtual camera according to a change of the position of the virtual character;

providing a visual field control area on the GUI, in response to a first touch operation on the visual field control area, controlling the virtual camera to shift from a first position to a second position according to the first touch operation and in response to the ending of the first touch operation, controlling the virtual camera to restore from the second position to the first position, receiving a game operation instruction during a process of restoring the virtual camera from the second position to the first position, and performing an action corresponding to the game operation instruction;

wherein the program is run to control the device where the non-transitory storage medium is located to also perform the following method: detecting whether the virtual character orients towards the second position; when the virtual character orients towards the second position, controlling the virtual camera to move from the second position to the first position in a speed descending manner; and when the virtual character does not orient towards the second position, controlling the virtual camera to move from the second position to the first position in a speed ascending manner.

15. The non-transitory storage medium as claimed in claim 14, wherein the program is run to control the device where the non-transitory storage medium is located to also perform the following method:
   before controlling the movement speed of the virtual camera to decrease or increase, determining that the virtual character maintains a current orientation for a first preset duration.

16. The non-transitory storage medium as claimed in claim 14, wherein the program is run to control the device where the non-transitory storage medium is located to also perform the following method:
   before controlling the virtual camera to restore from the second position to the first position,
   determining that a duration of the virtual camera at the second position reaches a second preset duration.

17. The non-transitory storage medium as claimed in claim 14, wherein the program is run to control the device where the non-transitory storage medium is located to also perform the following method:
   determining whether the game scene image currently displayed on the GUI contains the virtual character;
   when the game scene image currently displayed on the GUI does not contain the virtual character, controlling the virtual camera to move from the second position to the first position at a preset first speed; and
   when the game scene image currently displayed on the GUI contains the virtual character, controlling the virtual camera to move from the second position to the first position at a preset second speed,
   the second speed is less than the first speed.

18. An electronic device, comprising a memory and a processor, wherein the memory stores a computer program, and the processor is configured to execute the at least one executable instruction, and the at least one executable instruction comprises:
   associating a virtual camera with a position of a game scene where the virtual character is located to control a movement of the virtual camera according to a change of the position of the virtual character;
   providing a visual field control area on the GUI, and in response to a first touch operation on the visual field control area, controlling the virtual camera to shift from a first position to a second position according to the first touch operation and
   in response to the ending of the first touch operation, controlling the virtual camera to restore from the second position to the first position, receiving a game operation instruction during a process of restoring the virtual camera from the second position to the first position, and performing an action corresponding to the game operation instruction;
   wherein the process of restoring the virtual camera from the second position to the first position comprises: detecting whether the virtual character orients towards the second position; when the virtual character orients towards the second position, controlling the virtual camera to move from the second position to the first position in a speed descending manner; and when the virtual character does not orient towards the second position, controlling the virtual camera to move from the second position to the first position in a speed ascending manner.

\* \* \* \* \*